United States Patent
Malmin

(10) Patent No.: US 6,841,783 B2
(45) Date of Patent: Jan. 11, 2005

(54) CHANNELS FOR CONTROL OF SCINTILLATION CRYSTAL LIGHT RESPONSE

(75) Inventor: Ronald E. Malmin, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 96 days.

(21) Appl. No.: 10/318,082

(22) Filed: Dec. 13, 2002

(65) Prior Publication Data

US 2004/0113083 A1 Jun. 17, 2004

(51) Int. Cl.⁷ ............................................... G01T 1/164
(52) U.S. Cl. ................................. 250/368; 250/363.03
(58) Field of Search ............................. 250/368, 366, 250/367, 363.01, 363.02, 363.03, 370.01, 370.07, 370.09, 370.1

(56) References Cited

U.S. PATENT DOCUMENTS

| | | | | |
|---|---|---|---|---|
| 4,749,863 A | * | 6/1988 | Casey et al. | 250/363.03 |
| 5,453,623 A | * | 9/1995 | Wong et al. | 250/363.03 |
| 6,236,051 B1 | * | 5/2001 | Yamakawa et al. | 250/370.1 |
| 6,362,479 B1 | * | 3/2002 | Andreaco et al. | 250/366 |
| 6,403,961 B1 | * | 6/2002 | Stark | 250/363.09 |
| 6,528,793 B1 | * | 3/2003 | Chen et al. | 250/363.03 |

* cited by examiner

Primary Examiner—Otilia Gabor

(57) ABSTRACT

A radiographic imaging device includes one or more sensors, a scintillation crystal including an emission face, a first set of channels of a first channel depth in the emission face, and a second set of channels of a second channel depth different from the first channel depth in the emission face. Channels of the first and second sets are in a substantially parallel, spaced apart relationship along a first direction, and the second set of channels extend along a second direction non-parallel with the first direction. The scintillation crystal exhibits an anisotropic light spreading function to compensate for differences in sensor spacing along the first and second directions.

18 Claims, 6 Drawing Sheets

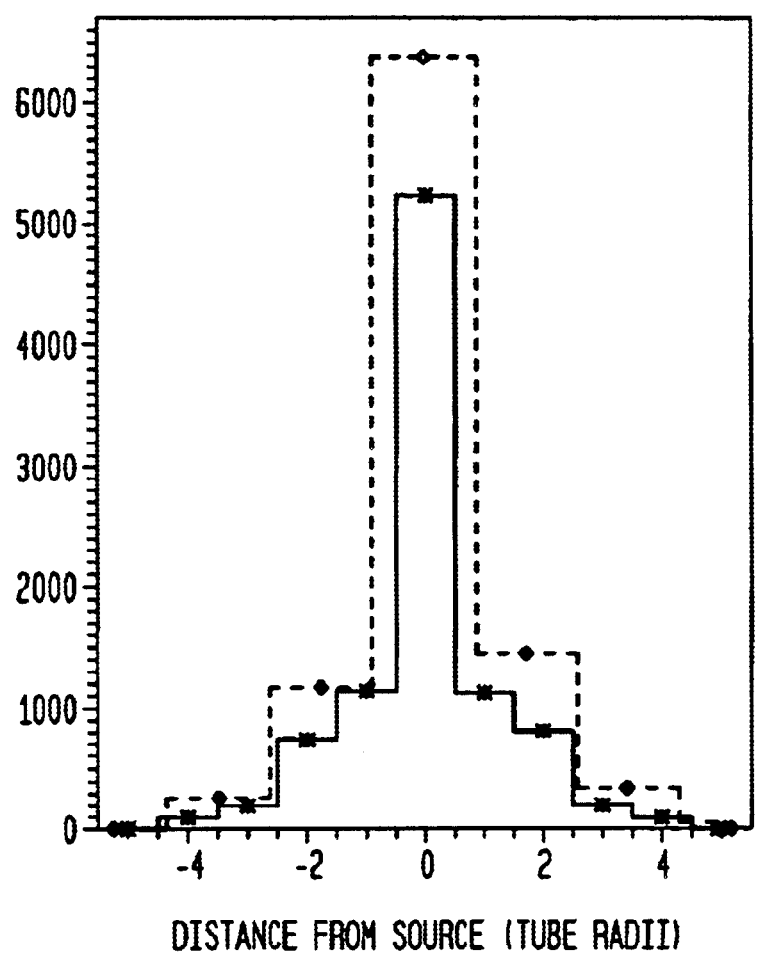

CHANNELS FOR CONTROL OF SCINTILLATION CRYSTAL LIGHT RESPONSE

BACKGROUND OF THE INVENTION

1. Field of the Invention

The present invention relates generally to an imaging device, and more particularly to a scintillation crystal for an imaging device.

2. Description of the Background Art

Radiographic imaging is the detection of radiation in order to form an image. By detecting the amount of radiation passing through or emanating from a test subject, the resultant image may give a representative view of the materials and construction of the test subject.

Gamma rays are a form of radiation that is emitted by excited atomic nuclei during the process of passing to a lower excitation state. Gamma radiation is capable of passing through soft tissue and bone. Gamma radiation may therefore be used for medical imaging, among other applications.

Gamma radiation for medical imaging usually involves a radiopharmaceutical, such as thallium or technetium, for example, that is administered to the patient. The radiopharmaceutical travels through the patient's body, and may be chosen to be absorbed or retained by an organ of interest. The radiopharmaceutical generates a predictable emission of gamma rays through the patient's body that can be detected and used to create an image. This may include imaging areas of the body or imaging specific organs. For example, a radiographic imaging device may be used to capture images of the heart, including real time images.

A radiographic imaging device may be used to detect radiation emanating from the patient and may be used to form an image or images for viewing and diagnosis. The radiographic imaging device may be a device such as a gamma or gamma ray camera, also referred to as a scintillation camera or an Anger camera. The radiographic imaging device allows a doctor to perform a diagnosis on a patient in a non-invasive manner and additionally may allow the doctor to observe organ function. In addition, the radiographic imaging device may be used for other imaging functions.

FIG. 1 shows a typical gamma camera or gamma camera component unit, including a scintillation crystal 105 having an emission face 108, a sensor 112 or a sensor array, and a processing apparatus 116.

The scintillation crystal 105 is typically a thallium doped sodium iodide crystal (NaI(Tl)) that generates photons upon absorbing radiation particles, such as gamma radiation (i.e., it scintillates). This scintillation process converts the gamma radiation into light photons, which can be more easily detected. The photons emerge from the emission face 108 and may be detected by the sensor 112 or sensor array.

The sensor 112 may be, for example, a photon detection sensor such as a photomultiplier tube. The sensor 112 receives the photons generated by the scintillation crystal 105 and converts them into a representative electronic signal. A typical photomultiplier tube 112 may include a semi-transparent photocathode, a focusing grid, dynodes, and an anode (not shown). Multiple sensors 112 may be used to form a sensor array in a radiographic imaging device.

The processing apparatus 116 receives the electronic signals from the sensor 112 or sensor array, may amplify and filter the signals, and processes them to form an image.

FIG. 2 is a block diagram of a scintillation crystal 105 and an associated array of sensors 112, as used in a gamma camera, for example. Each sensor 112 generates an output current signal that may be amplified, filtered and processed to generate an image. The scintillation crystal 105 emits light photons upon absorption of radiation, thereby generating an event 122. For example, the event 122 may emit a plurality of photons that may be received by one or more of the sensors 112. It should be understood that the event 122 may be any type of event, including a source of photons, a source of rays due to a radioactive decay, a source of electrons or protons, a source of electromagnetic waves, etc.

FIG. 3A shows a histogram created by photon counts from the sensors 112 in a direction along the X-axis in response an event 122. A histogram may be thought of as a visual representation of the contents of a series of storage bins that count photons as they are received and categorize them according to the location of the sensors along a predefined direction. The histogram therefore creates a wave form peak. The peak may indicate the approximate center of the event 122 (e.g., a centroid). The centroid may be determined from one or more sensor outputs and may be used to create an image composed of one or more event centroids. Similar considerations apply to the Y-centroid, as shown in FIG. 3B.

FIG. 4 shows an array of sensors 112 and the event 122. Due to the difference in spacing and distribution along the X axis and along the Y axis, as is reflected in the distances $D_X$ and $D_Y$, it is highly desirable that some correction or adjustment be made to the sensor readings in order to accurately determine the centroid of the event 122.

The figure shows an example of a hexagonal sensor array used for imaging a large area. Typically, rows of the contiguous sensors 112 are aligned in the direction of a Cartesian axis of the scintillation crystal, such as the X-axis, for example. However, if the sensors 112 are grouped into an array in a square grid fashion, large gaps are left between the individual sensors 112, as the sensors 112 are typically round. Therefore, in order to minimize the gaps and pack the sensors 112 together as densely as possible, the sensors 112 are typically formed into a grid having a substantially hexagonal arrangement (as shown) in order to minimize gaps between the sensors 112.

FIG. 5 shows the event 122 and the sensors 112 that are affected by the event 122. From FIG. 5 it can be seen that in the X dimension, there are approximately five samples (columns of sensors) within the area of the event 122. However, in the Y dimension, there are only approximately three samples (rows of sensors) within the area of the event 122. Because the sensors 112 are hexagonally packed as shown in FIG. 4, the histogram in the X-axis direction will have more bins than the Y-axis histogram (see FIG. 3B), and therefore resolution and linearity along the Y-axis will suffer in comparison to the resolution and linearity along the X-axis.

In scintillation crystals of approximately 2.5 cm thickness, the difference in sampling along the X- and Y-axes produces a measurable and problematic difference in resolution and linearity characteristics in the X and Y directions. This effect is due to the differences of sensor spacing along the X-axis and the Y-axis, as can be seen from the markings along each axis as shown in FIG. 5. The spacing of the X-axis samples is 1*R, where R is the photomultiplier tube radius; while the Y sample spacing is ($\sqrt{3}$*R) or (1.73*R). Therefore, when using standard positioning algorithms for generating an image, different resolution and linearity characteristics are obtained in the X and Y directions.

Early gamma cameras utilized scintillation crystals approximately 1 cm in thickness. For such crystals, the difference in X-axis and Y-axis sampling produces only minor differences in resolution and linearity characteristics. Recently, however, the crystal thickness has been increased to more than 2.5 cm in order to facilitate detection of high energy radiation. The extra crystal thickness is needed because the high energy radiation penetrates farther into the crystal, while the lower energy radiation does not penetrate very far. The lower energy radiation therefore causes scintillations that are farther from the emission face 108, and the resulting photons may spread more within the scintillation crystal 105 before reaching the emission face 108 (see FIG. 2).

A prior art approach to radiographic image improvement has employed a series of channels cut or otherwise formed in the scintillation crystal. The purpose of the channels is to guide emitted photons through the crystal and to minimize the lateral movement ("spreading") of photons within the crystal. By minimizing spreading, the sensors are more likely to receive photons emanating from scintillation events located directly below them. The channels therefore function somewhat as a collimator and direct or channel the photons in a direction substantially perpendicular to the plane of the scintillation crystal 105 and/or perpendicular to the emission face 108.

In one prior art approach, the scintillation crystal 105 is formed with two sets of substantially orthogonal channels which form a plurality of rectangular solid portions. The channels of the prior art scintillation crystal 105 are formed to be of identical and uniform depths. The prior art approach is used by Bicron, Newbury, Ohio, 44065, in their STAR-BRITE crystal.

However, for a channel depth sufficient to achieve good performance along the X-axis (i.e., to achieve an acceptable output resolution and an acceptable output differential linearity), the corresponding resolution and differential linearity along the Y-axis is considerably worse. The degradation in performance is attributable to the coarser sampling of the light response function, especially in the tail of the light response function along the Y-axis. The fall off of the light response function with distance is quite sharp because of the depth of the grooves (approximately one-half of the crystal thickness).

There remains a need, therefore, for improvements in radiographic imaging devices.

SUMMARY OF THE INVENTION

A radiographic imaging device is provided according to a first embodiment of the invention. The radiographic imaging device comprises one or more sensors for detecting emitted photons. The radiographic imaging device further comprises a scintillation crystal spaced in relation to the one or more sensors and includes an emission face from which photons are emitted. The scintillation crystal emits photons in response to impingement by radiation. The one or more sensors are directed to receive a substantial portion of the emitted photons emanating from the emission face. The radiographic imaging device further comprises a first set of channels of a first channel depth in the emission face. Channels of the first set of channels are in a substantially parallel, spaced apart relationship. The radiographic imaging device further comprises a second set of channels of a second channel depth in the emission face different from the first depth. Channels of the second set of channels are in a substantially parallel, spaced apart relationship, and the second set of channels are non-parallel with the first set of channels.

A radiographic imaging device is provided according to a second embodiment of the invention. The radiographic imaging device comprises one or more sensors for detecting emitted photons. The radiographic imaging device further comprises a scintillation crystal spaced in relation to the one or more sensors and including an emission face from which photons are emitted. The scintillation crystal emits photons in response to impingement by radiation. The one or more sensors are directed to receive a substantial portion of the emitted photons emanating from the emission face. The radiographic imaging device further comprises a first set of channels of a first channel depth in the emission face. Channels of the first set of channels are in a substantially parallel, spaced apart relationship. The radiographic imaging device further comprises a second set of channels of a second channel depth in the emission face different from the first channel depth. Channels of the second set of channels are in a substantially parallel, spaced apart relationship, and the second set of channels are substantially orthogonal to the first set of channels.

A scintillation crystal is provided according to another aspect of the invention. The scintillation crystal includes an emission face from which photons are emitted in response to absorption of radiation, a first set of channels of a first channel depth formed in the emission face, each channel extending in a first direction along the emission face in a substantially parallel, spaced apart relationship with other channels in the first set, and a second set of channels of a second channel depth different from the first channel depth formed in the emission face, each channel of the second set of channels extending in a second direction along the emission face in a substantially parallel, spaced apart relationship with other channels in the second set, the second direction being non-parallel with the first direction.

The above and other features and advantages of the present invention will be further understood from the following description of the preferred embodiments thereof, taken in conjunction with the accompanying drawings.

BRIEF DESCRIPTION OF THE DRAWINGS

FIGS. 3A and 3B show histograms created by photon counts from the sensors during an event;

DETAILED DESCRIPTION OF THE PREFERRED EMBODIMENTS

Figure 6:
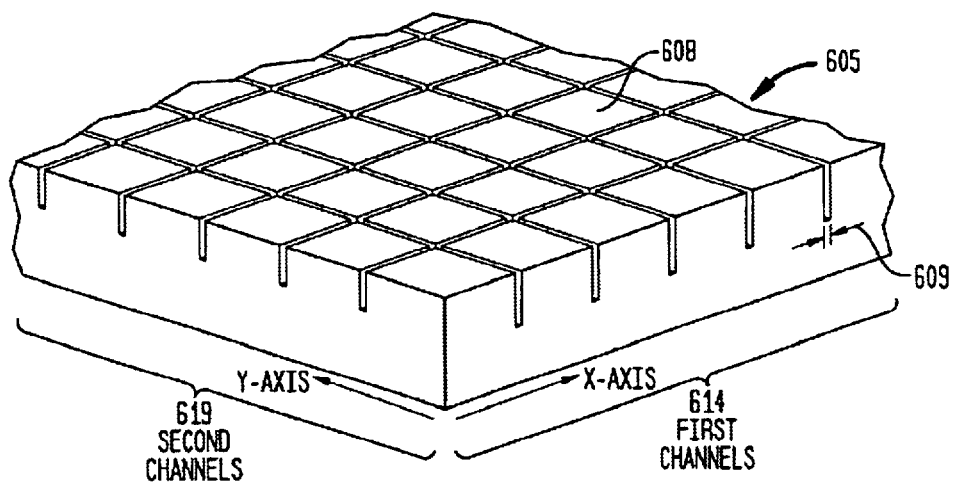
FIG. 6 shows an embodiment of a scintillation crystal according to the invention.

FIG. 6 shows an embodiment of a scintillation crystal 605 according to the invention. The scintillation crystal 605 may be employed in a radiographic imaging device, such as a gamma camera, for example. Upon absorbing radiation particles, such as gamma rays, for example, the scintillation crystal 605 will emit one or more light photons.

Figure 1:
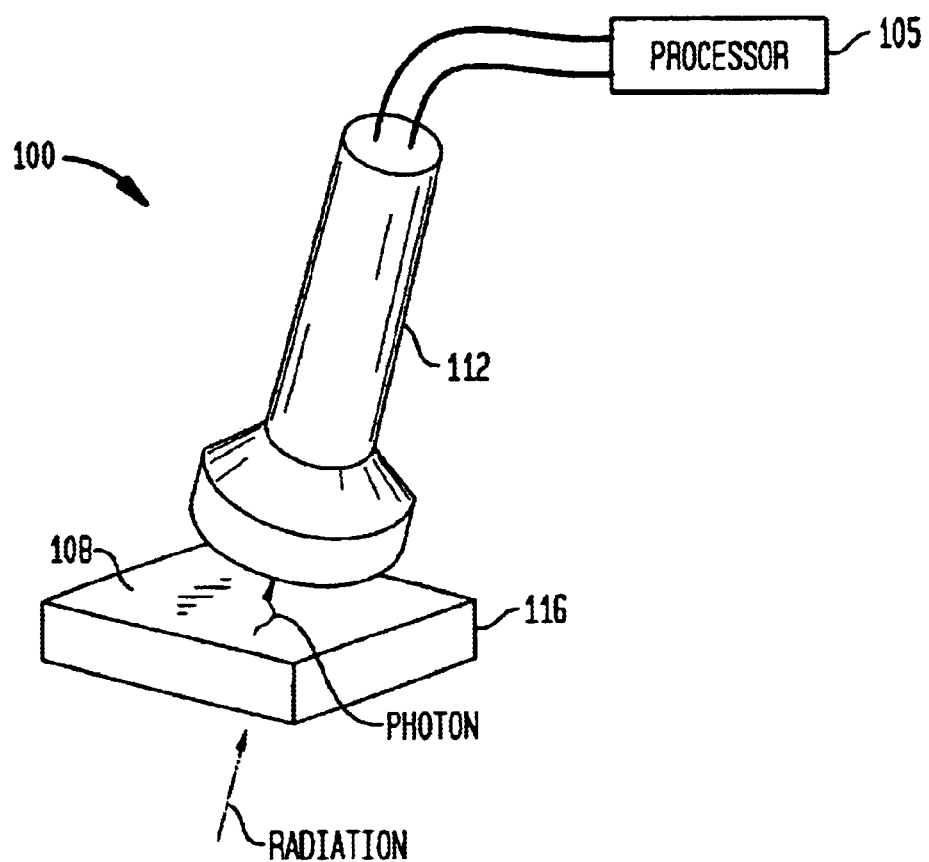
FIG. 1 shows a typical gamma camera or gamma camera component unit, including a scintillation crystal, a sensor or sensor array, and a processing apparatus.
Figure 2:
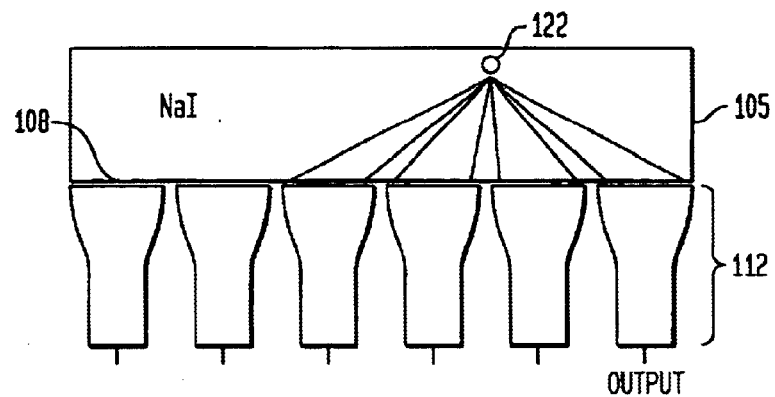
FIG. 2 is a block diagram of a scintillation crystal and an associated array of sensors.
Figure 3A:
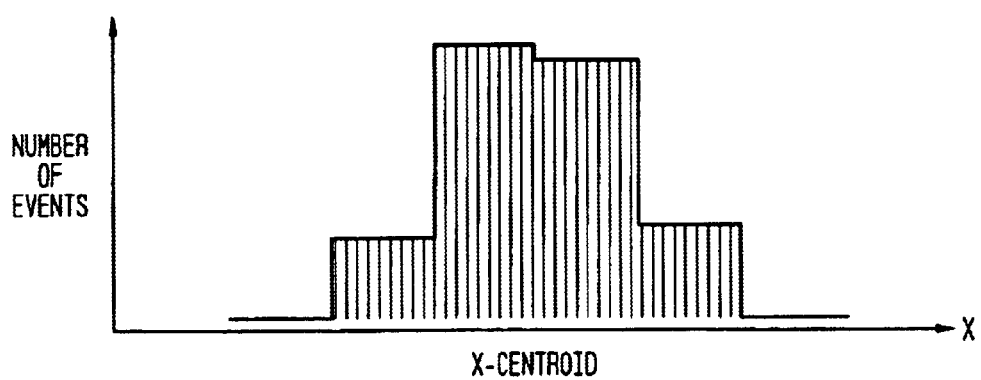
Figure 4:
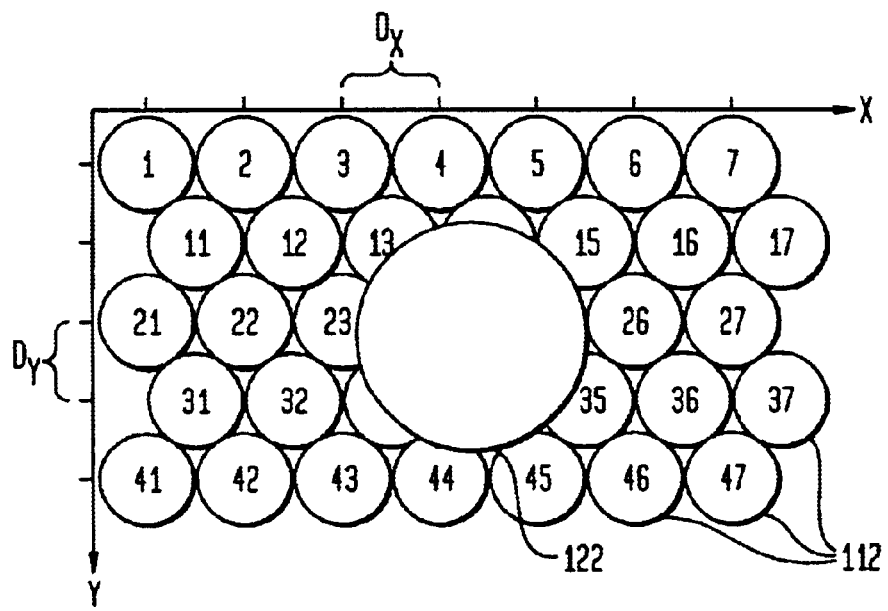
FIG. 4 shows an array of sensors and an event.

The scintillation crystal 605 according to the invention has an emission face 608 and is formed with two sets of channels 614 and 619. The emission face 608 may be substantially planar, or may be curved, etc. The first set of channels 614 is formed substantially perpendicular to the X-axis (using the same coordinate system orientation as FIG. 4). A second set of channels 619 is formed substantially perpendicular to the Y-axis. The channels of each set are preferably substantially parallel, and are formed in a spaced apart relationship. The two sets of channels form a plurality of substantially rectangular solid portions, each including a portion of the emission face 608.

The channels of a set are preferably substantially uniform. This means that each channel of a set is preferably similar in width, depth, and cross-sectional shape. In a preferred embodiment, the channels have a substantially rectangular cross-sectional shape, including a substantially flat bottom 609, although other cross-sectional shapes could be employed.

In addition, the two sets of channels 614 and 619 are preferably substantially orthogonal, and meet at substantially right angles to form the substantially rectangular solid portions. In a lesser preferred embodiment, the sets of channels may meet at other angles.

The channels are preferably spaced about 6 millimeters (mm) apart. For a typical 3 inch diameter sensor 112, such as a photomultiplier tube, the sensor 112 would be positioned over about 10–11 channels of a set of channels.

The width of the channels are preferably as narrow as practical, in order to limit the volume of scintillation crystal lost to channels. The channels themselves may be air gaps, but also may be filled with a material such as reflective powder or other suitable types of reflective material, or other solid material.

In a preferred embodiment, the depth of the first set of channels 614 is about one-half inch for a 1 inch thick scintillation crystal 605, while the depth of the second set of channels 619 is generally about one-eighth inch less than the first set of channels 614. As a general rule of thumb, the second set of channels 619 must be shallower than the first set of channels 614 by an amount greater than a smallest obtainable manufacturing tolerance.

For other crystal thicknesses, the ratios of the depths of the first and second channels to the thickness of the crystal may vary as a function of crystal thickness, as the relationship of channel depth to crystal thickness is non-linear, but may be determined readily through experimentation and testing.

The first and second channel depths are chosen to achieve a light spread over a sufficient number of sensors to enable centroid determination with good linearity and resolution in the X and Y directions. The depths will vary not only with crystal thickness but also with the average depth of interaction in the crystal of the radiation for which the system is designed.

It should be understood that these numbers are merely examples, and the spacing, width, and depth may be changed and still remain within the scope of the invention.

The function of the two sets of channels 614 and 619 is to inhibit the spread of the photons within the scintillation crystal 605 and over a larger than desired area of sensors 112. In order to get more counts in the histogram bins at the edge of an event 122, the invention allows the photons (or other radiation) to spread more in the Y direction than in the X direction. Light detection performance is thereby improved in the Y direction through the controlled broadening of the light response function in the Y direction.

Figure 7:
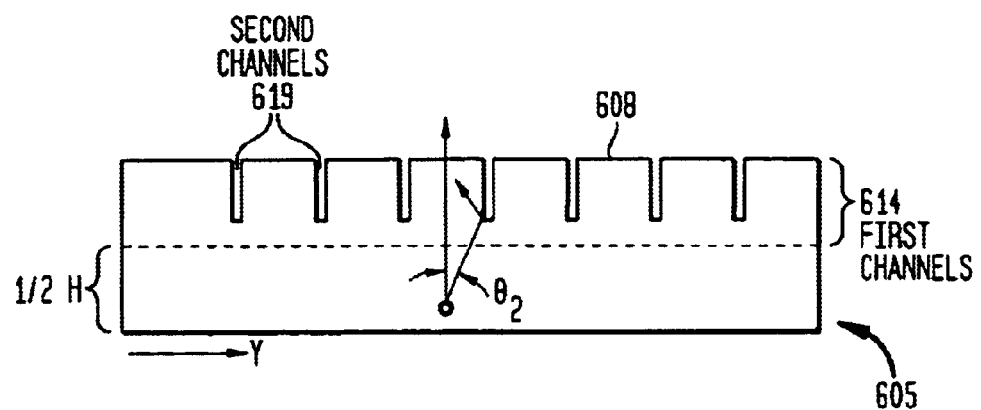
FIG. 7 is a side view of the scintillation crystal along the Y-axis.

FIG. 7 is a side view of the scintillation crystal 605, looking along the X-axis and perpendicular to the Y-axis. A photon emitted during a scintillation event may travel through the scintillation crystal 605 until it hits a crystal boundary. For example, the photon may travel substantially perpendicularly up through one of the rectangular solid portions and pass out of the emission face 608 of the scintillation crystal, to be detected by a sensor 112. However, if the photon is traveling at a first angle $\theta_1$ and hits a side of a rectangular solid portion, as defined by a channel, the photon may experience internal reflection due to the high index of refraction of the scintillation crystal 605 (the index of refraction for a NaI crystal is typically about 1.8) and can be directed or "channeled" towards the emission surface. The second set of channels 619 (which are shallower than first channels 614) therefore controls the spreading of photons in the Y-direction.

Figure 8:
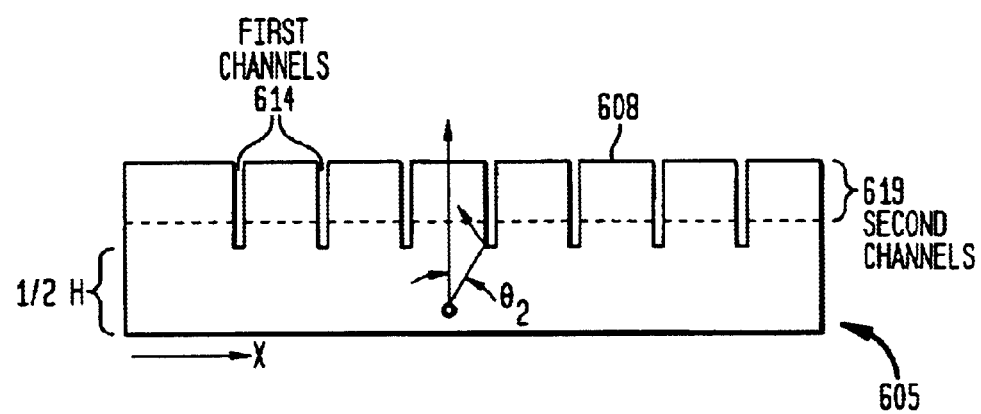
FIG. 8 is a side view of the scintillation crystal along the X-axis.

FIG. 8 is a side view of the scintillation crystal 605, looking along the Y-axis and perpendicular to the X-axis. The first set of channels 614 controls the spreading of photons in the X-direction. As can be seen in this view, the first set of channels 614 is deeper than the second set of channels 619. Therefore, an emitted photon at a given distance from the emission face 608 will be directed or "channeled" toward the emission face 608 at a greater angle $\theta_2$ in the X-direction than angle $\theta_1$ in the Y-direction. The figure depicts the angle corresponding to the channel closest to the event, but the principle applies to all channels. The shallower second depth therefore produces a spatially anisotropic light response function, and allows simultaneous optimization of the performance characteristics in the X and Y directions. Therefore, due to the difference in the channel depths, the angle $\theta_2$ may be chosen to be larger than the angle $\theta_1$.

Figure 5:
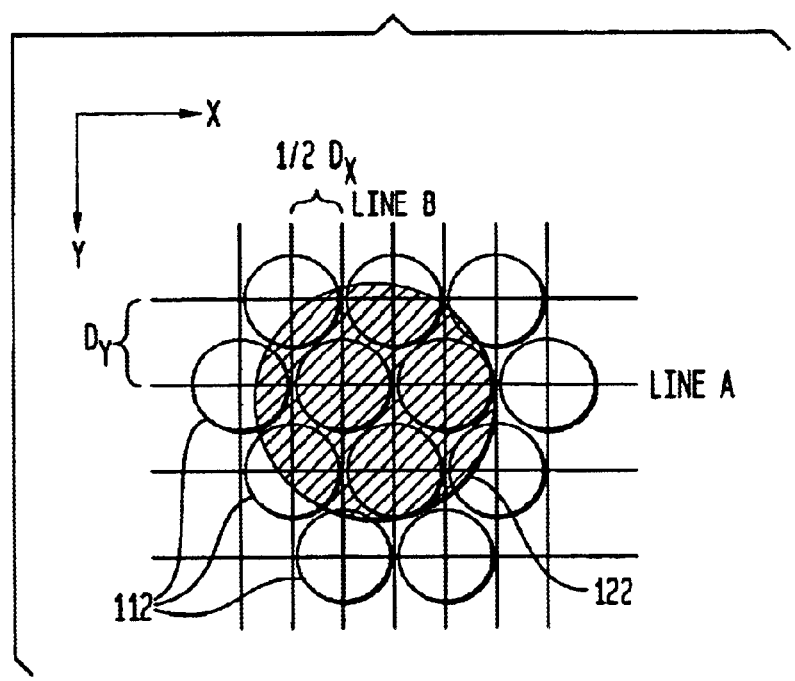
FIG. 5 shows the event and the sensors that are affected by the event.

Because the channel grooves are on the emission face, the shallower they are the more the light from a scintillation event has the ability to spread. Because the sampling in the Y-direction is coarser than in the X-direction as shown in FIG. 5, the present invention enables the light diffusion in the Y-direction to spread slightly more than it does in the X-direction. In this way, more sensors participate in the centroid calculation in the Y-direction While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A radiographic imaging device, comprising:
   a plurality of sensors for detecting emitted photons;
   a scintillation crystal spaced in relation to said plurality of sensors and including an emission face from which photons are emitted in response to absorption of radiation, said plurality of sensors being positioned to receive a substantial portion of said emitted photons emanating from said emission face;
   a first set of channels of a first channel depth formed in said emission face, each channel extending in a first direction along said emission face in a substantially parallel, spaced apart relationship with other channels in said first set; and
   a second set of channels of a second channel depth different from said first channel depth formed in said emission face, each channel of said second set of channels extending in a second direction along said emission face in a substantially parallel, spaced apart relationship with other channels in said second Set, said second direction being non-parallel with said first direction.

2. The radiographic imaging device of claim 1, wherein a channel comprises a substantially rectangular cross-section.

3. The radiographic imaging device of claim 1, wherein said plurality of sensors are arranged in a substantially hexagonal pattern and said second direction is substantially orthogonal to said first direction.

4. The radiographic imaging device of claim 1, wherein for a one inch thick scintillation crystal, said first channel depth is about one-half inch and said second channel depth is about three-eighths inch.

5. The radiographic imaging device of claim 1, wherein said second set of channels is shallower than said first set of channels by an amount greater than a smallest obtainable manufacturing tolerance.

6. The radiographic imaging device of claim 1, wherein said plurality of sensors are arranged in a substantially hexagonally arranged sensor array, with centers of sensor rows along said first direction being farther apart than centers of sensor columns along said second direction, and said second set of channels is shallower than said first set of channels.

7. The radiographic imaging device of claim 1, wherein for a given point on said emission face at a given distance from a scintillation event, photons are restricted from spreading in said first direction before reaching said emission face up to an angle $\theta_1$, which is smaller than an angle $\theta_2$ through which photons are restricted from spreading in said second direction before reaching said emission face.

8. A radiographic imaging device, comprising:

a plurality of sensors for detecting emitted photons;

a scintillation crystal spaced in relation to said plurality of sensors and including an emission face from which photons are emitted in response to absorption of radiation, said plurality of sensors being positioned to receive a substantial portion of said emitted photons emanating from said emission face;

a first set of channels of a first channel depth formed in said emission face, each channel extending in a first direction along said emission face in a substantially parallel, spaced apart relationship with other channels in said first set; and a second set of channels of a second channel depth different from said first channel depth formed in said emission face, each channel of said second set of channels extending in a second direction along said emission face in a substantially parallel, spaced apart relationship with other channels in said second set, said second direction being substantially orthogonal to said first direction.

9. The radiographic imaging device of claim 8, wherein a channel comprises a substantially rectangular cross-section.

10. The radiographic imaging device of claim 8, wherein said plurality of sensors are arranged in a substantially hexagonal pattern and said second direction is substantially orthogonal to said first direction.

11. The radiographic imaging device of claim 8, wherein said second set of channels is shallower than said first set of channels by an amount greater than a smallest obtainable manufacturing tolerance.

12. The radiographic imaging device of claim 8, wherein said plurality of sensors are arranged in a substantially hexagonally arranged sensor array, with centers of sensor rows along said first direction being farther apart than centers of sensor columns along said second direction, and said second set of channels is shallower than said first set of channels.

13. The radiographic imaging device of claim 8, wherein for a given point on said emission face at a given distance from a scintillation event, photons are restricted from spreading in said first direction before reaching said emission face up to an angle $\theta_1$, which is smaller than an angle $\eta_{22}$ through which photons are restricted from spreading in said second direction before reaching said emission face.

14. A scintillation crystal, comprising:

an emission face from which photons are emitted in response to absorption of radiation;

a first set of channels of a first channel depth formed in said emission face, each channel extending in a first direction along said emission face in a substantially parallel, spaced apart relationship with other channels in said first set; and a second set of channels of a second channel depth different from said first channel depth formed in said emission face, each channel of said second set of channels extending in a second direction along said emission face in a substantially parallel, spaced apart relationship with other channels in said second set, said second direction being non-parallel with said first direction.

15. The scintillation crystal of claim 14, wherein a channel is formed of a substantially rectangular cross-section.

16. The scintillation crystal of claim 14, wherein for a one inch thick scintillation crystal, said first set of channels is formed at a depth of about one-half inch and said second set of channels is formed at a depth of about three-eighths inch.

17. The scintillation crystal of claim 14, wherein said second set of channels is formed at a shallower depth than said first set of channels by an amount greater than a smallest obtainable manufacturing tolerance.

18. The scintillation crystal of claim 14, wherein for a given point on said emission face at a given distance from a scintillation event, photons are restricted from spreading in said first direction before reaching said emission face up to an angle $\theta_1$, which is smaller than an angle $\eta_2$ through which photons are restricted from spreading in said second direction before reaching said emission face.

* * * * *